(12) United States Patent
Sityon et al.

(10) Patent No.: US 10,380,186 B2
(45) Date of Patent: Aug. 13, 2019

(54) VIRTUAL TOPOLOGICAL QUERIES

(75) Inventors: Arik Sityon, Ganne Tiqwa (IL); Uri Ben-Dor, Givat Shmuel (IL); Ran Biron, Petah Tiqwa (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 2685 days.

(21) Appl. No.: 12/787,593

(22) Filed: May 26, 2010

(65) Prior Publication Data
US 2011/0295841 A1 Dec. 1, 2011

(51) Int. Cl.
*G06F 16/901* (2019.01)
(52) U.S. Cl.
CPC .................. *G06F 16/9024* (2019.01)
(58) Field of Classification Search
USPC ................................ 707/722, 716
See application file for complete search history.

(56) References Cited

U.S. PATENT DOCUMENTS

| | | | |
|---|---|---|---|
| 7,424,530 B2* | 9/2008 | Chagoly et al. | 709/224 |
| 2003/0065874 A1* | 4/2003 | Marron | G06F 17/30011 711/100 |
| 2008/0263008 A1* | 10/2008 | Beyer | G06F 17/30935 |
| 2008/0313119 A1* | 12/2008 | Leskovec et al. | 706/46 |
| 2010/0082701 A1* | 4/2010 | Maheshwari | 707/803 |
| 2010/0161643 A1* | 6/2010 | Gionis et al. | 707/765 |
| 2010/0318565 A1* | 12/2010 | Heil et al. | 707/770 |
| 2011/0078140 A1* | 3/2011 | Dube | G06F 17/30716 707/727 |

OTHER PUBLICATIONS

Fernandez et al., "A Structure-Based Approach to Querying Semi-Structured Data", 1996, pp. 1-16.*
Wong et al., "Topological Queries on Graph-structured XML Data: Models and Implementations", Jul. 2008, vol. 4 Issue 3, p. 206.*

* cited by examiner

*Primary Examiner* — Amresh Singh

(57) ABSTRACT

Systems, methods, and other embodiments associated with virtual topological queries are described. One example method includes executing a first topological query on a stored graph to generate a first result graph. The example method may also include manipulating the first result graph to generate a virtual query result graph as a function of a second topological query. The example method may also include providing the virtual query result graph.

16 Claims, 10 Drawing Sheets

VIRTUAL TOPOLOGICAL QUERIES

BACKGROUND

Directed graphs may be used to model information technology (IT) infrastructures. Users who search a graph of an IT infrastructure sometimes use several different queries that have similar topologies. For example, a user may run several queries comprising the same two types of node, where differences between the queries may revolve around attributes of the nodes, attributes of an edge connecting the two nodes, and so on. However, in conventional systems, if the user desired to change the topology of the queries (e.g., to contain a third node), the user may be required to update the queries individually. This manual process may be time consuming and resource expensive.

Furthermore, once the user has updated and re-submitted the queries for execution, some conventional query engines would run the queries and store data for individual queries despite their similarities. These queries may contain similar results making some of the processing and data storage redundant. Furthermore, if the user requests live updates to the results of the queries, conventional systems may store data and process the IT infrastructure graph on a query by query basis.

BRIEF DESCRIPTION OF THE DRAWINGS

The accompanying drawings, which are incorporated in and constitute a part of the specification, illustrate various systems, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
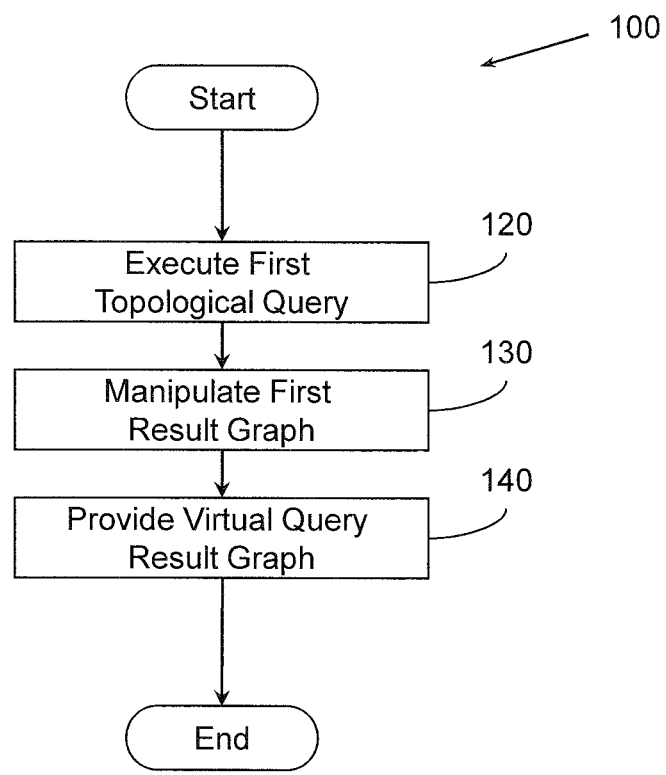
FIG. 1 illustrates an embodiment of a method associated with virtual topological queries.

Systems, methods, non-transitory computer-readable media and other embodiments associated with virtual topological queries are described. In one embodiment, the disclosure describes concepts and operators from relational algebra that are modified and applied to sub graph isomorphism in a computer system. Instead of using a relation, a result graph is used. Similar to relational algebra where the result of invoking an operator over a relation produces a new relation, a topological query is run over a graph to produce a new graph. Similar to primitive operators defined over sets, primitive operators are defined over topological query results. Selection is the different constraints which can be defined as part of the topological query. Operators including union, intersection, projection, and join (by restriction) are defined as part of one or more embodiments. With the new concepts disclosed herein, numerous applications can benefit from them as will be appreciated from reading the disclosure. For example, better manageability of queries, nested queries (multiple perspectives, query over query etc), security models, and so on may be implemented.

In another embodiment, an example method includes executing a first topological query on a stored graph to generate a first result graph. The example method also includes manipulating the first result graph to generate a virtual query result graph as a function of a second topological query. Thus, the virtual query result graph may represent a result of a virtual query that is virtual in the sense that it was not explicitly run on the stored graph. It is virtual in the sense that it may not have a pattern graph definition of its own but rather be defined by concatenation of operators over existing topological queries. To illustrate, it may be possible to generate a third query that produces the same results as manipulating results of the first query based on the second query. However, generating the third query may be complex and processing intensive. Instead, executing the second query on the results of the first query may be faster than generating the third query in some cases. Thus, the third query may be considered a virtual query because the third query is represented by the first query, the second query, and a manipulation instruction, and because third query is not explicitly run on the stored graph. In another example, manipulating the result graph according to a second topological query may be similar to invoking an operator over a relational algebra relation to generate a new relation. In this manner, running a topological query described by a query graph over a first graph produces a new graph.

Virtual topological queries facilitate process flows for searching and monitoring data stored in graphs that conventional systems could not efficiently handle. For example, consider a case where a user desires results of several topologically similar queries with slightly differing attributes. Using virtual topological queries, the user may define a topology query that searches a stored graph for the topology, and a series of second queries that limit the results of the topology search according to desired attributes. Now if the user desires to modify the topology, instead of modifying every query, the user can modify the topology query and not have to change some types of second queries. Furthermore, when run by the engine, instead of performing similar processing for many queries, the engine may use the same results for the topology query for many of the second queries. This attribute is also expressed when the user requests live updates to results of a virtual query by designating the virtual query as an active query. When a change is made that affects the results of the topology query, the engine may be able to process the topology query separately and then invoke the second queries as appropriate. This may further save memory and processing time.

Virtual topological queries may also enhance sequential flows for searching graphs. A sequential flow is a series of queries that are executed depending on results of prior queries. For example, a first query may search for machines in racks that have a heat exceeding a certain value. If the number of machines found exceeds a certain value, the sequential flow may execute a second query. If the number of machines found does not exceed the value, a third query may be run. The sequential flow may then provide the results of the second query or the third query to a user that set up the sequential flow of virtual queries. In one embodiment, the process is not a process flow engine of if-else operations. Rather, one query may be restricted by another query, for example, by not being executed or not as a function of the first query.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), an optical medium, a random access memory (RAM), a read only memory (ROM), a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, instructions in memory, instructions in execution on a machine, and/or combinations of each to perform a function(s) or an action(s), and/or to cause a function or action from another logic, method, and/or system. Logic may include an instruction controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, logics, computers or other devices, or combinations of these.

Unless specifically stated otherwise, it is appreciated that throughout the disclosure, terms including processing, providing, executing, manipulating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
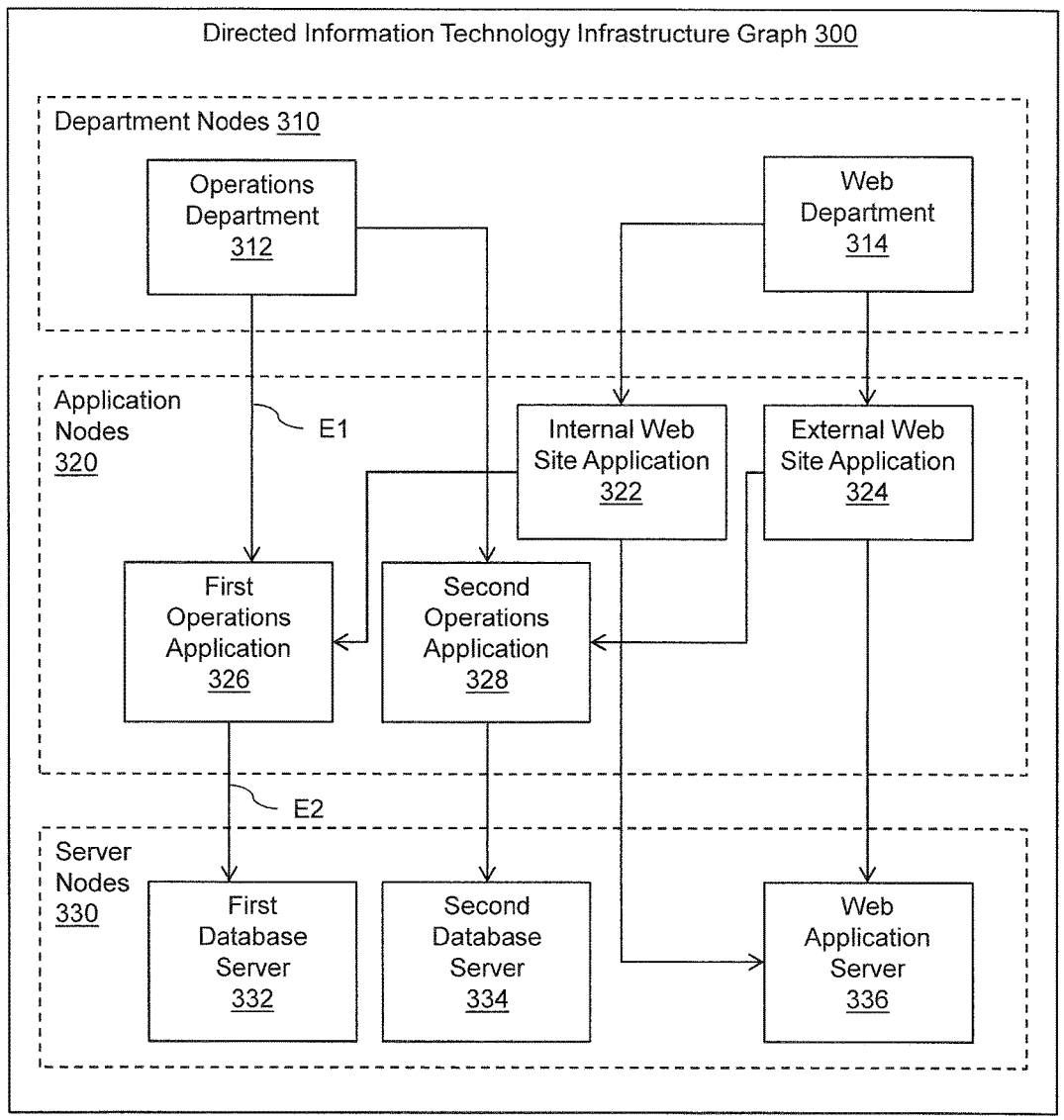
FIG. 3 illustrates an embodiment of a directed information technology infrastructure graph with which example systems and methods, and equivalents may interact.

FIG. 1 illustrates an embodiment of a method 100 associated with virtual topological queries. Some actions described in reference to method 100 may be performed on a graph similar to directed graph 300 (FIG. 3). At 120, method 100 includes executing a first topological query on a stored graph to generate a first result graph.

FIG. 3 shows an example embodiment of a directed graph 300 of relationships between entities in a portion of an IT infrastructure. In one example, graph 300 may be a stored graph on which the first topological query could be executed at 120. The graph 300 includes several application nodes 320 (e.g., internal web site application node 322, external web site application node 324, first operations application node 326, second operations application node 328) that may represent applications and/or computers on which the applications are operating. The graph 300 also includes several server nodes 330 (e.g., first database server node 332, second database server node 334, web application server node 336) that may represent servers. The graph 300 also includes several department nodes 310 (e.g., operations department node 312, web department node 314) that may correspond to departments that are responsible for maintaining entities associated with application nodes 320 and/or server nodes 330. Thus, a node in an IT infrastructure graph may not necessarily be tied to a specific tangible item and may, for example, facilitate illustrating relationships between an IT infrastructure and a corporate structure. Furthermore, while several nodes and edges are shown in the graph 300, a person having ordinary skill in the art will recognize that this may not be an exhaustive list of nodes and edges, that the categories of what nodes represent are merely chosen for example purposes, and that other organizational schema may be applicable. Additionally, while an IT infrastructure graph is described, this merely serves as an example graph type on which topological queries may be executed.

In this example, the directed edges in the graph are represented by arrows and illustrate relationships between components of the IT infrastructure. For example, a first edge E1 connecting the operations department node 312 to the first operations application node 326 may represent the fact that the operations department is responsible for managing a first operations application. A second edge E2 connecting the first operations application node 326 to the first database server node 332 may represent the fact that the first operations application relies on data from a first database server. While a directed graph is shown, a person having ordinary skill in the art will recognize that an undirected graph or a graph using some other organization scheme may also be used to represent an IT infrastructure.

Returning now to FIG. 1, at 130, method 100 also includes manipulating the first graph to generate a virtual query result graph. The first graph may be manipulated as a function of a second topological query. Manipulating the first result graph may comprise selecting a manipulation technique (e.g., union, intersection, restriction) based on the first result graph. Some manipulation techniques are described below. At 140, method 100 also includes providing the virtual query result graph (e.g. displaying the electronic data of the graph on a display device, transmitting the electronic data of the graph to a computer or other memory location, and so on). In one example, manipulating the first graph may comprise executing the second topological query on the first result graph. Or in another example, executing the second topological query on the base graph but restricting the allowed result of a selected node in the second topological query by one or more result sets returned as part of the first topological query, and by that extending the results of the first query by data from the base graph.

Figure 4:
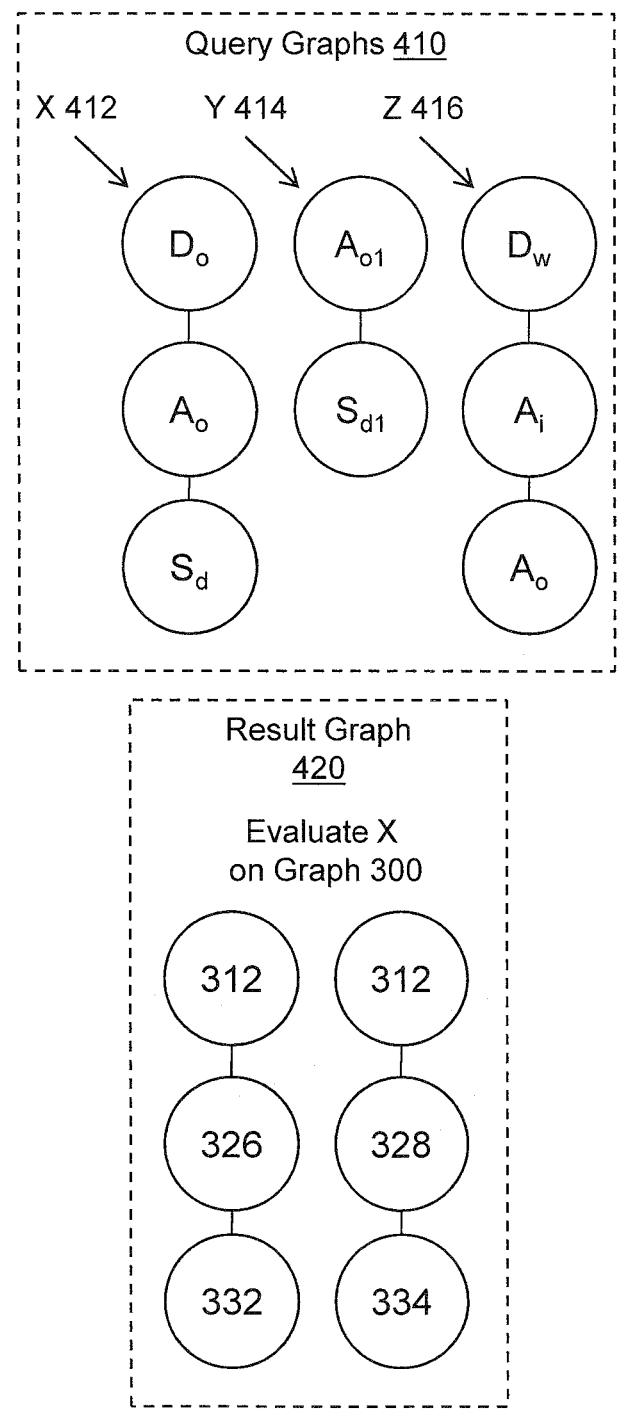
FIG. 4 illustrates example embodiments of topological query graphs and example topological query results.

For example, FIG. 4 illustrates example embodiments of topological query graphs 410. The query graphs 410 may be designed to represent queries used for searching for sub-graphs of directed graph 300 (FIG. 3). For example, a query graph X 412 includes a graph containing a department node $D_o$, an application node $A_o$, and a server node $S_d$. The department node $D_o$ is linked to the application node $A_o$, and the application node $A_o$ is linked to the server node $S_d$. The nodes in query graph X 412 are further described by subscripts. For example, the department node $D_o$ is restricted to nodes associated with operations departments, the application node $A_o$ is restricted to nodes associated with operations applications, and the server node $S_d$ is restricted to nodes associated with database servers. Query graph Y 414 includes an application node $A_{o1}$, that is restricted to nodes associated with first operations applications, and a server node $S_{d1}$ that is restricted to nodes associated with first database servers. Query graph Z 416 includes a department node $D_w$ that is restricted to nodes associated with web departments, a first application node $A_i$ that is restricted to nodes associated with internal web applications, and a second application node $A_o$ that is restricted to nodes associated with operations applications.

FIG. 4 also illustrates an example result graph 420 obtained by evaluating a query containing query graph X 412 (query X) on graph 300. This technique may also be described as a projection of graph X onto graph 300. The result graph 420 contains a first sub-graph containing nodes associated with operations department node 312, first operations application node 326, and first database server node 332. The result graph 420 also contains a second sub-graph containing nodes associated with operations department node 312, second operations application node 326, and second database server node 334. Thus, result graph 420 may represent a result of executing query X on graph 300 when graph 300 is the stored graph. However, graph 300 may also represent a result of the first query. Thus, result graph 420 may represent a virtual query result graph generated by manipulating graph 300 by executing query X on graph 300. This result may be desirable, for example, if results of executing query X would have included other sub-graphs if query X were run on a stored graph from which graph 300 is derived.

In another example, manipulating the first result graph may comprise restricting the first result graph according to the second topological query. Restricting the first result graph may comprise selecting sub-graphs of the first result graph that satisfy a condition of the second topological query.

Figure 5:
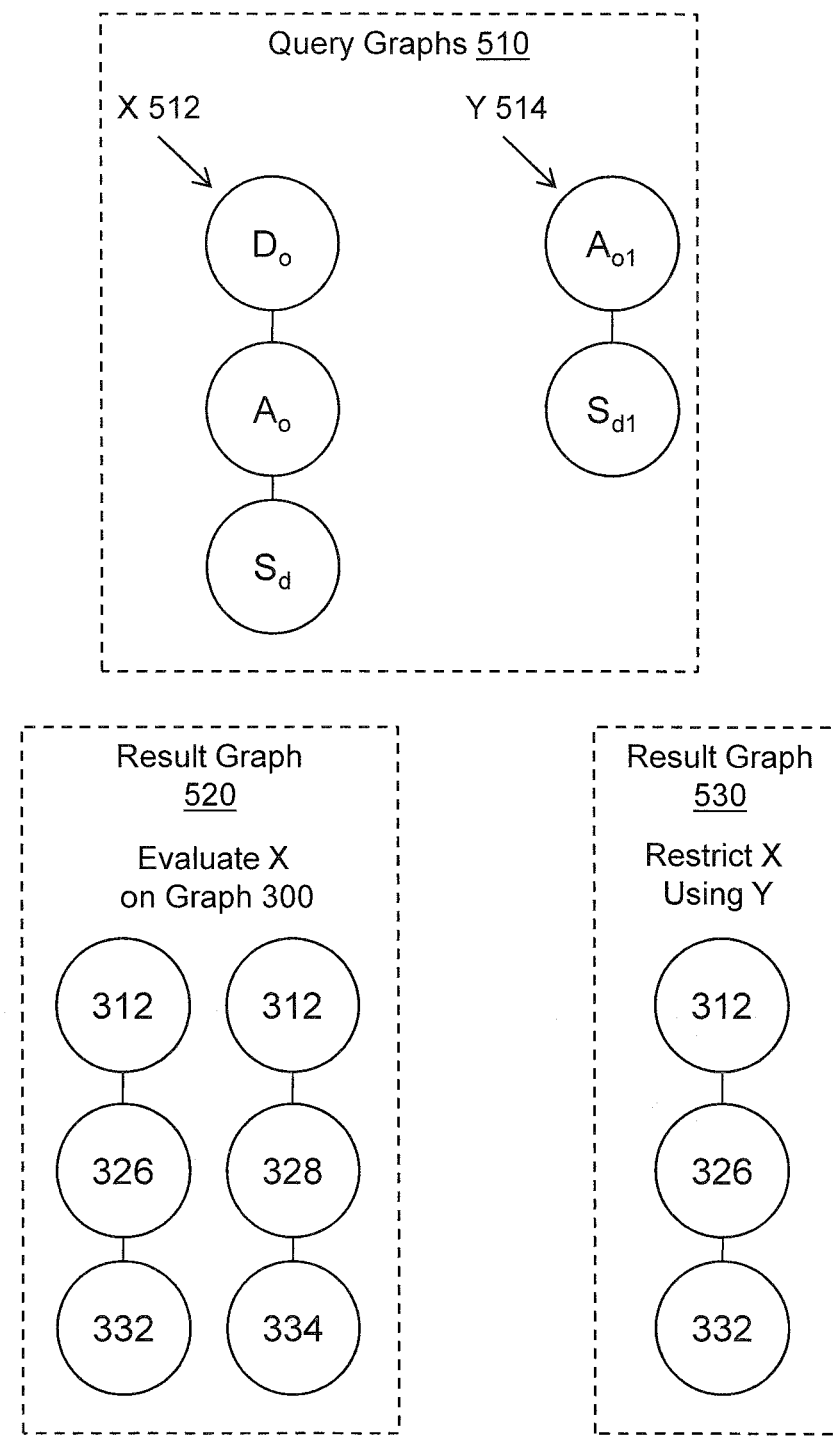
FIG. 5 illustrates example embodiments of topological query graphs and example topological query results.

For example, FIG. 5 illustrates example embodiments of topological query graphs 510 and example result graphs 520 and 530. Query graph X 512, query graph Y 514, and result graph 520 containing a first sub-graph and a second sub-graph are similar to items described in reference to FIG. 4. Result graph 530 illustrates an example of restricting the results of query X using a query containing query graph Y 414 (query Y). Because the second sub-graph of result graph 520 does not include a node associated with a first operations application node, it is not included in result graph 530. A similar evaluation could also be made with respect to the second sub-graph not having node associated with a first database server node. Because the first sub-graph does contain both a node associated with a first operations application node (node 326) and a node associated with a first database server node (node 332), the first sub-graph is included in result graph 530.

In another example, manipulating the first result graph may comprise creating a union of the first result graph and a second result graph. The second result graph may be generated by executing the second topological query.

Figure 6:
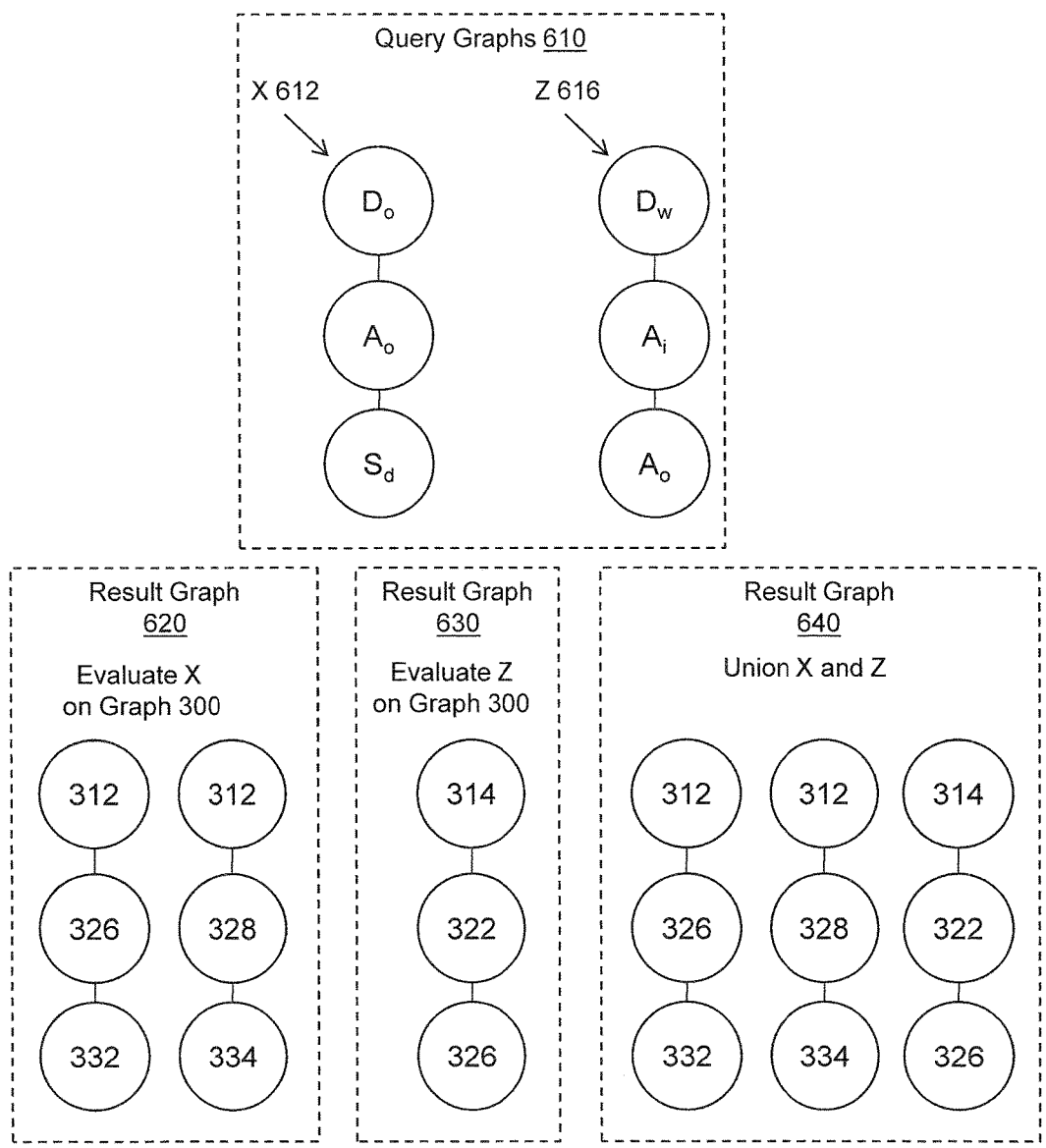
FIG. 6 illustrates example embodiments of topological query graphs and example topological query results.

For example, FIG. 6 illustrates example embodiments of topological query graphs 610 and example result graphs 620, 630, and 640. Query graph X 612, query graph Z 616, and result graph 620 containing a first sub-graph and a second sub-graph are similar to items described in reference to FIG. 4. Result graph 630 may be obtained by evaluating a query containing query graph Z 616 (query Z) on graph 300. Thus, result graph 640 illustrates an example union of results of query X and query Z, comprising the first sub-graph of result graph 620, the second sub-graph of result graph 620, and the result of evaluating query Z.

In another example, manipulating the first result graph may comprise intersecting the first result graph and a second result graph. The second result graph may be generated by executing the second topological query. Creating the intersection of the first result graph and the second result graph may comprise joining a first sub-graph from the first result graph with a second sub-graph from the second result graph. Joining the first sub-graph and the second sub-graph may result in a third sub-graph. The third sub-graph may comprise nodes from the first sub-graph, nodes from the second sub-graph, and a shared node. The shared node may be associated with a node in the first sub-graph and may be associated with a node in the second sub-graph.

Figure 7:
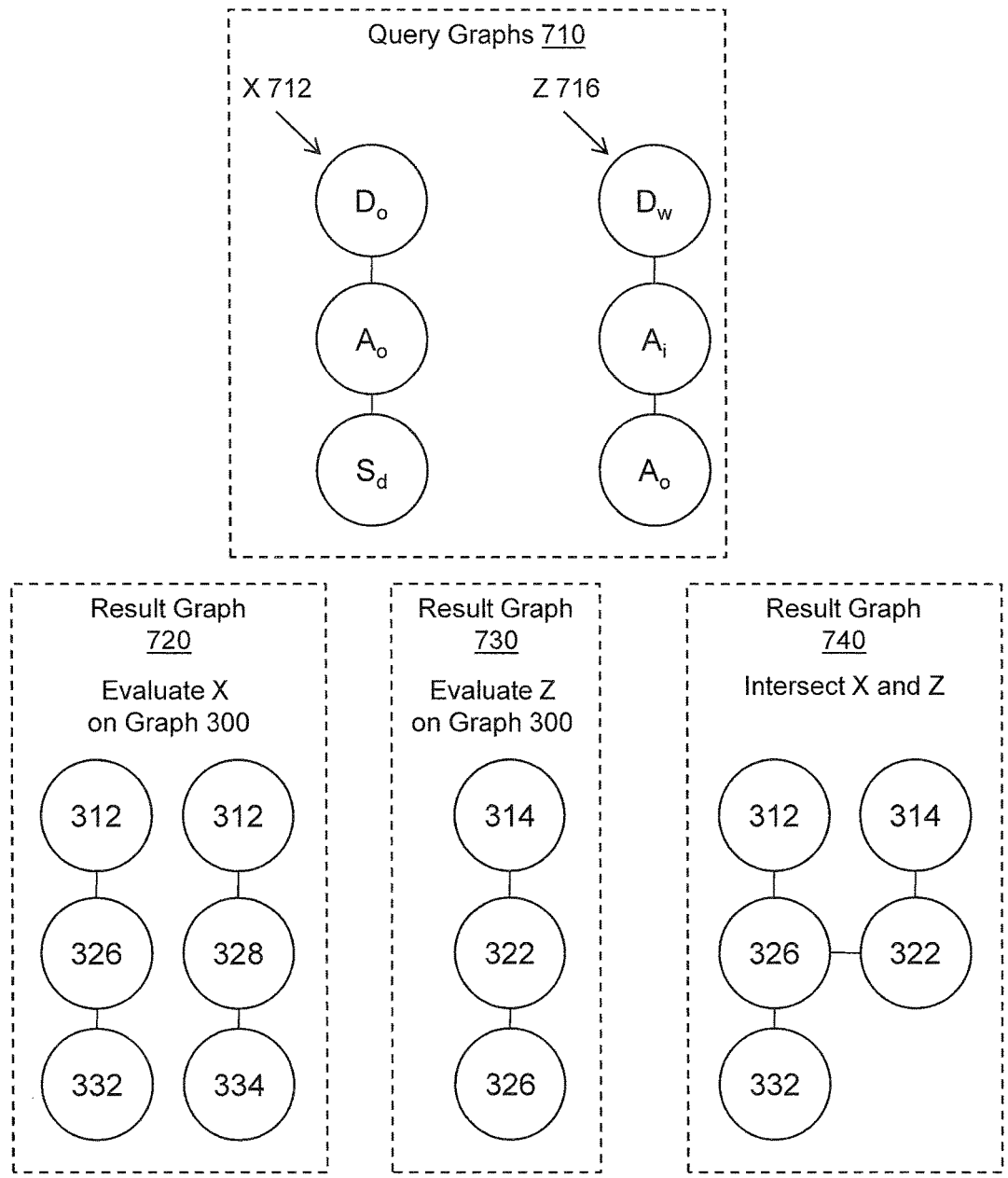
FIG. 7 illustrates example embodiments of topological query graphs and example topological query results.

For example, FIG. 7 illustrates example embodiments of topological query graphs 710 and example result graphs 720, 730, and 740. Query graph X 712, query graph Z 716, and result graph 720 containing a first sub-graph and a second sub-graph are similar to items described in reference to FIG. 4. Result graph 730 is similar to a result graph 630 described in reference to FIG. 6. Result graph 740 illustrates an example intersection of results of query X and query Z. A node associated with first operations application node 326 appears in both the first sub-graph of result graph 720 and in result graph 730. Thus, result graph 740 may be generated so that these two sub-graphs are joined together at a node associated with node 326. In this example, because the second sub-graph of result graph 720 does not share nodes with result nodes found in graph 730, nodes from the second sub-graph are not reflected in result graph 740. However, a person having ordinary skill in the art may recognize that other joining techniques may be appropriate. Thus, in one example, result graph 740 could be generated to contain a second sub-graph comprising the second sub-graph of result graph 730.

The manipulation techniques described above, projection, restriction, union, and join, may represent primitive operators that can be performed using topological queries. While these four operators are defined and described above, a person having ordinary skill in the art may recognize other manipulation techniques also fall into the category of primitive operators for graph manipulation.

While FIG. 1 illustrates various actions occurring in serial, it is to be appreciated that various actions illustrated in FIG. 1 could occur substantially in parallel. By way of illustration, a first process could execute the first topological query, a second process could manipulate the first result graph, and a third process could provide the virtual query result graph. While three processes are described, it is to be appreciated that a greater and/or lesser number of processes could be employed and that lightweight processes, regular processes, threads, and other approaches could be employed.

In one example, method 100 may be implemented as computer executable instructions. Thus, in one example, a computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
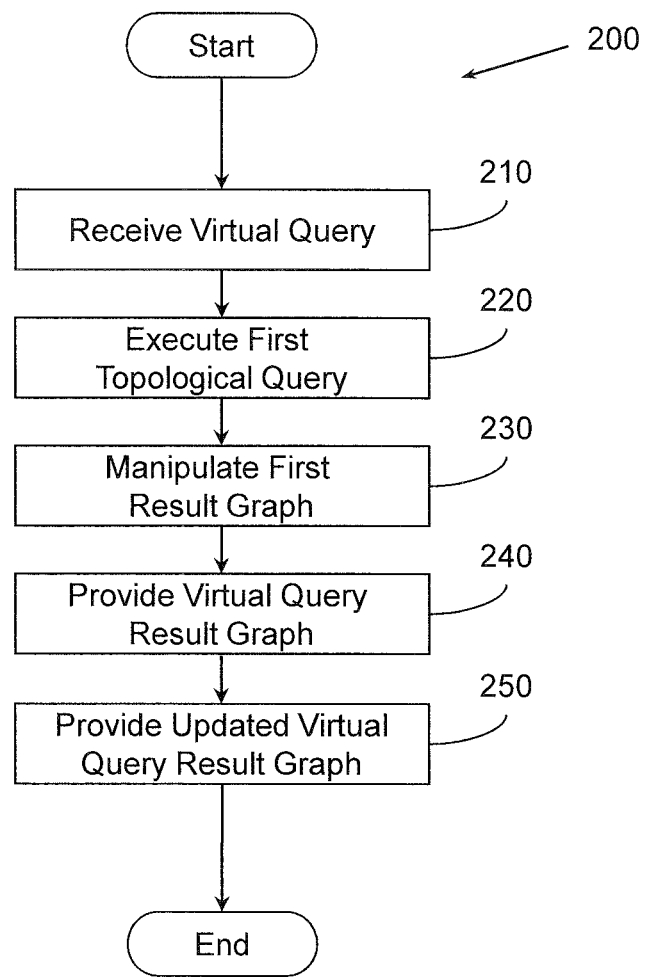
FIG. 2 illustrates an embodiment of a method associated with virtual topological queries.

FIG. 2 illustrates an embodiment of a method 200 associated with virtual topological queries. FIG. 2 contains several actions similar to those described in reference to method 100 (FIG. 1). For example, method 200 includes executing a first topological query at 220, manipulating a first result graph as a function of a second topological query at 230, and providing a virtual query result graph at 240. However, method 200 includes additional actions.

At 210, method 200 also includes receiving a virtual query from a client. The virtual query may identify the first topological query, the second topological query, and a technique for manipulating the first topological query based on the second topological query. In one example, the virtual query result graph may be provided to the client at 240.

At 250, method 200 also includes providing an updated virtual query result graph. The updated virtual query result graph may be provided upon detecting a change to the stored graph that would affect the structure of the first result graph. Thus, method 200 facilitates handling active queries where the client has requested live updates to results of a query as the stored graph changes.

By way of illustration an administrator of a data center may have an active query that monitors states of computers in racks in the data center for conditions that may indicate a device is experiencing conditions that could lead to a device failure. The query may run on a directed graph that stores information describing how devices in the data center are related by location, processing information and so forth. When a computer reaches a running temperature beyond a certain threshold, the stored graph may change to reflect the computer having this property. This may result in an updated virtual query result graph being provided to the administrator that identifies information about the computer including the location of the computer, other devices that rely on processes performed by the computer, and so on.

Figure 8:
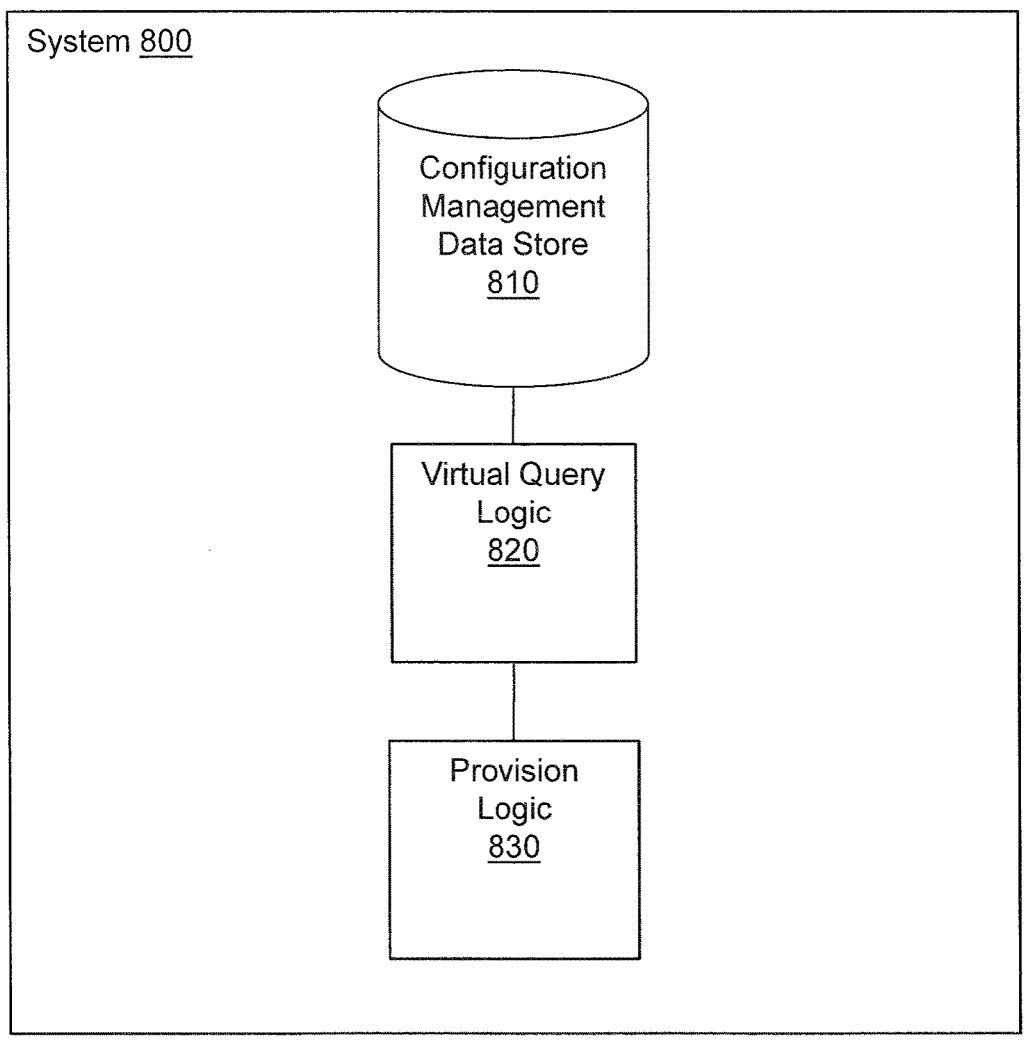
FIG. 8 illustrates an embodiment of a system associated with virtual topological queries.

FIG. 8 illustrates an embodiment of a system 800. System 800 includes a configuration management data store (CMDB) 810. The CMDB 810 may store descriptions of components of an information technology (IT) infrastructure. The CMDB 810 may also store a directed graph describing relationships between the components of the IT infrastructure.

System 800 also includes a virtual query logic 820 that includes at least executable instructions stored on a non-transitory computer-readable medium. The virtual query logic 820 controls execution of a virtual query comprising a first query, a second query, and a manipulation instruction. A result of the first query may comprise a sub-graph of the directed graph in the CMDB 810. The manipulation instruction may involve the first query and the second query. The manipulation instruction may instruct the virtual query logic 820 to perform, for example, an execution of the second query on the result of the first query, a restriction of the result of the first query using the second query, a union of the result of the first query and a result of the second query, and an intersection of the result of the first query and a result of the second query. System 800 also includes a provision logic 830. Provision logic 830 may provide a result of the virtual query. The result may be provided, for example, to a client that requested that the virtual query be executed. The result may be for example, a packet, a file, a graph, and so on.

Thus, system 800 may allow efficient management of similar topological queries by, for example, copying search results between topologically similar queries. Additionally, by facilitating restriction queries that can be run on top of topology query results, processing time for the overall query may be reduced as the restriction query may be run for over a smaller set of sub-graphs.

Figure 9:
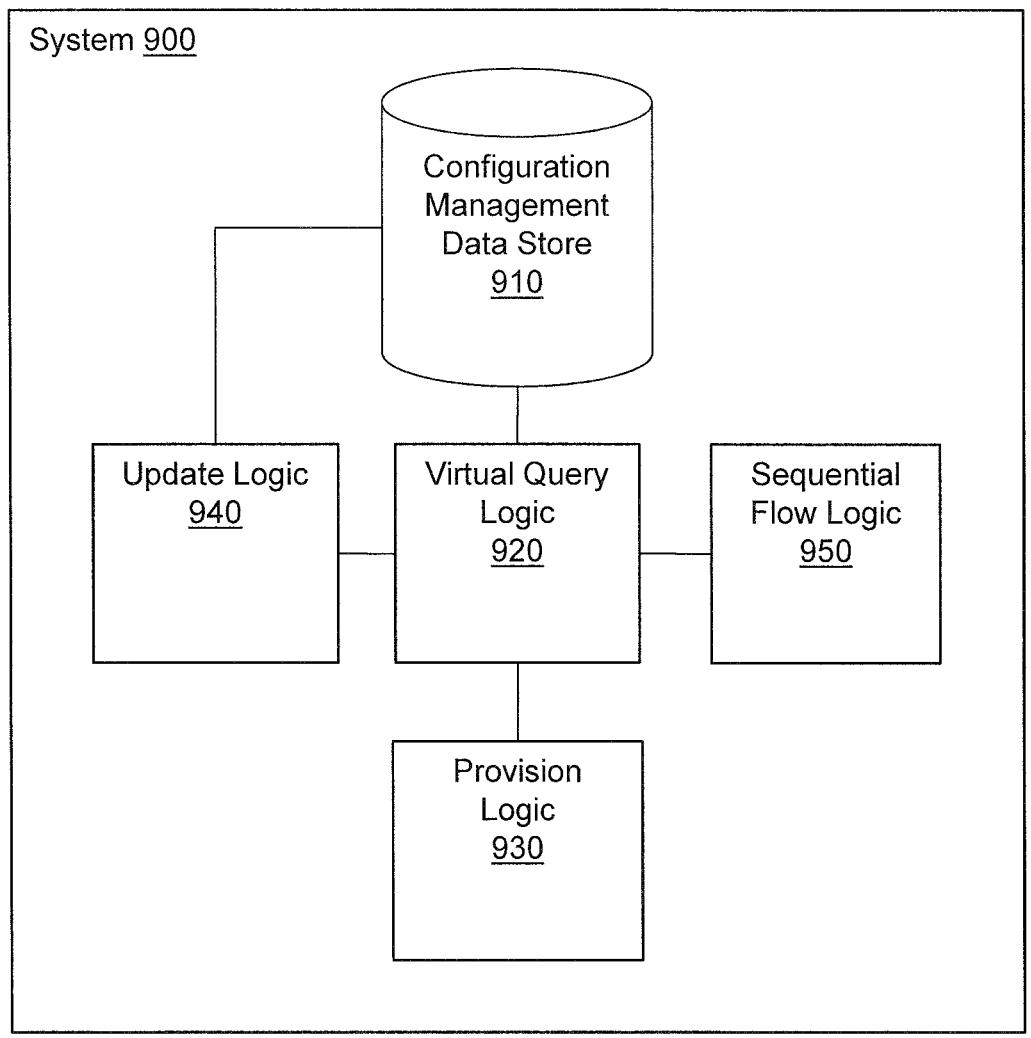
FIG. 9 illustrates an embodiment of a system associated with virtual topological queries.

FIG. 9 illustrates an embodiment of a system 900 associated with virtual topological queries. FIG. 9 contains several elements similar to those described in reference to method 800 (FIG. 1). For example, system 900 includes a CMDB 910, a virtual query logic 920, and a provision logic 930. However, system 900 includes additional elements. System 900 also includes an update logic 940. The update logic 940 may monitor changes to the directed graph and instruct the virtual query logic 920 to re-execute an active virtual query.

System 900 also includes a sequential flow logic 950. The sequential flow logic 950 may control execution of a sequence of conditional virtual topological queries by the virtual query logic 920. A conditional virtual topological query may be executed when a result of a virtual topological query meets a condition defined by the conditional virtual topological query.

System 900 illustrates a system that a client can use to listen for live results of a series of queries. Using system 900, the client may define a series of queries that will update over time as the graph in the CMDB 910 changes. Depending on the results of some queries, different subsequent queries may be invoked. Data from the series of queries may be pooled into an active conditional query result graph that is provided to the client when the result of the query has changed. Thus, instead of invoking the series of queries manually based on evaluating results, a user may set up a series of queries and conditions that automate a string of topological searches.

Figure 10:
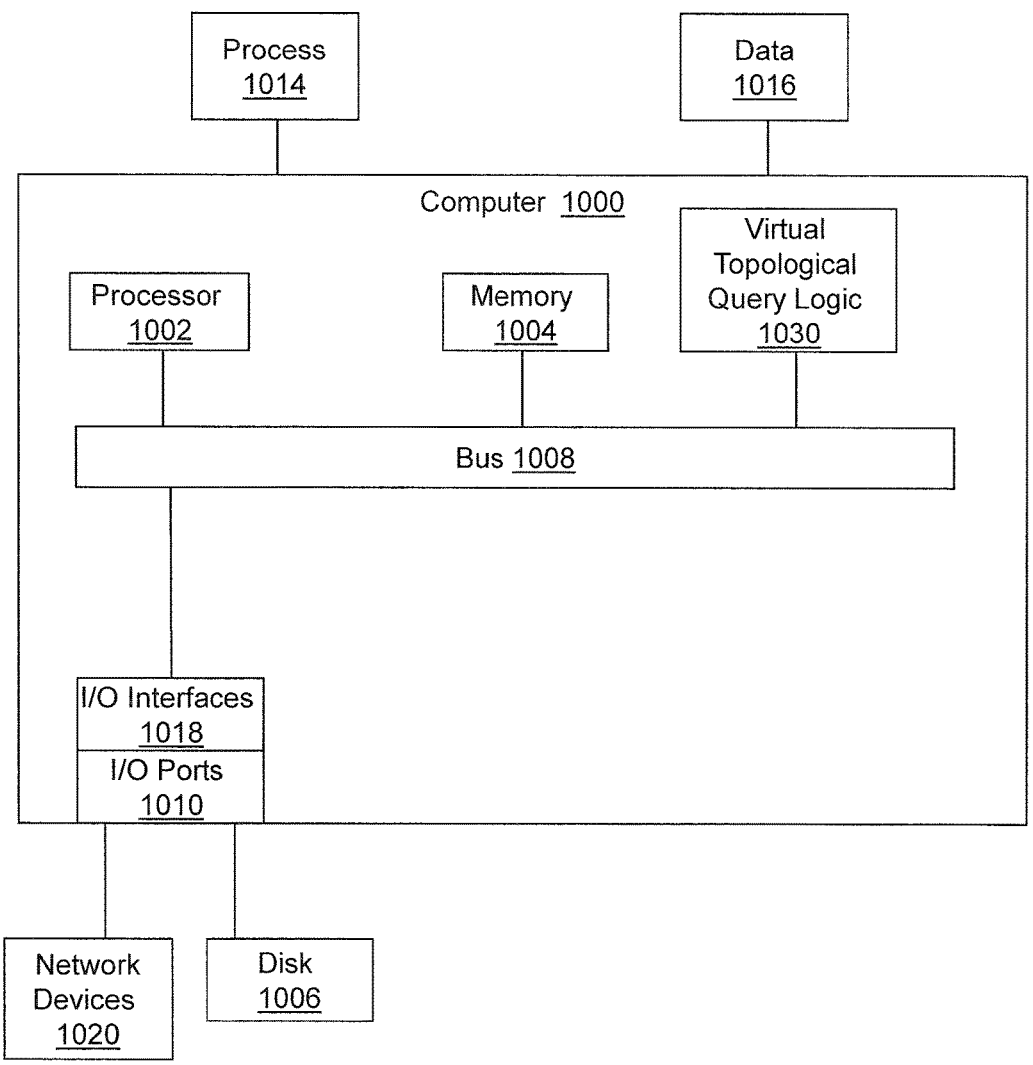
FIG. 10 illustrates an embodiment of a computing environment in which example systems and methods, and equivalents, may operate.

FIG. 10 illustrates an example embodiment of a computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a virtual topological query logic 1030. In different examples, the virtual topological query logic 1030 may be implemented in hardware, instructions in memory, instructions in execution, firmware, and/or combinations thereof. While the virtual topological query logic 1030 is illustrated as a hardware component attached to the bus 1008, it is to be appreciated that in one example, the logic virtual topological query 1030 could be implemented in the processor 1002.

The virtual topological query logic 1030 may provide means (e.g., hardware, instructions in memory, instructions in execution, firmware) for executing a first topological query identified in a virtual topological query on a stored graph. The means may be implemented, for example, as an ASIC. The means may also be implemented as computer executable instructions that are presented to computer 1000 as data 1016 that are temporarily stored in memory 1004 and then executed by processor 1002. The virtual topological query logic 1030 may also provide means (e.g., hardware, instructions in memory, instructions in execution, firmware) for manipulating a result of the first topological query as a function of a second topological query identified in the virtual topological query.

Generally describing an example configuration of the computer 1000, the processor 1002 may be a variety of various processors including dual microprocessor and other multi-processor architectures. A memory 1004 may include volatile memory (e.g., a RAM) and/or non-volatile memory (e.g., a ROM).

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a flash memory card, a memory stick, an optical medium and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., peripheral component interconnect express (PCIE), 1394, universal serial bus (USB), Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

The invention claimed is:

1. A non-transitory computer-readable medium storing computer-executable instructions that when executed by a computer cause the computer to perform a method, the method comprising:
   executing a first topological query on a stored graph to generate a first result graph;
   generating a virtual query result graph as a function of a second topological query, wherein generating the virtual query result graph comprises, in lieu of the computer executing the second topological query on the stored graph, manipulating the first result graph to generate the virtual query result graph, and wherein manipulating the first result graph comprises at least one of executing the second topological query on the first result graph, restricting the first result graph based on the second topological query, performing a union of the first result graph and the second topological query, or performing an intersection of the first result graph and the second topological query; and
   providing the virtual query result graph;

wherein execution of the second topological query on the virtual query result graph involves less processing time than execution of the second topological query on the stored graph.

2. The non-transitory computer-readable medium of claim 1, where restricting the first result graph comprises selecting sub-graphs of the first result graph that satisfy a condition of the second topological query.

3. The non-transitory computer-readable medium of claim 1, where manipulating the first result graph comprises executing the second topological query to generate a second result graph and creating a union of the first result graph and the second result graph.

4. The non-transitory computer-readable medium of claim 1, where manipulating the first result graph comprises executing the second topological query to generate a second result graph and creating an intersection of the first result graph and the second result graph.

5. The non-transitory computer-readable medium of claim 4, where creating the intersection of the first result graph and the second result graph comprises joining a first sub-graph from the first result graph with a second sub-graph from the second result graph to create a third sub-graph.

6. The non-transitory computer-readable medium of claim 5, where the third sub-graph comprises nodes from the first sub-graph, nodes from the second sub-graph, and a shared node that is associated with a node in the first sub-graph and that is associated with a node in the second sub-graph.

7. The non-transitory computer-readable medium of claim 1, the method further comprising detecting a change to the stored graph that would affect the structure of the first result graph and providing an updated virtual query result graph in response to detecting the change.

8. The non-transitory computer-readable medium of claim 1, wherein manipulating the first result graph further comprises selecting a manipulation technique based, at least in part, on the first result graph.

9. The non-transitory computer-readable medium of claim 1, the method comprising receiving a virtual query from a client that identifies the first topological query, the second topological query, and a technique for manipulating the first topological query based on the second topological query.

10. A system, comprising:
a configuration management data store (CMDB) embodied on a non-transitory computer-readable medium to store descriptions of components of an information technology (IT) infrastructure and to store a directed graph describing relationships between the components of the IT infrastructure;
a virtual query logic, including at least instructions stored on a non-transitory computer-readable medium, to control execution of a virtual query comprising a first query, a second query, and a manipulation instruction involving the first query and the second query, wherein:
a result of the first query comprises a sub-graph of the directed graph in the CMDB;
the instructions to control execution of the virtual query instructs the virtual query logic to generate a virtual query result graph as a function of the second query;
the manipulation instruction instructs the virtual query logic to manipulate the result of the first query to generate the virtual query result graph; and
the manipulation instruction instructs the virtual query logic to perform at least one of execution of the second query on the result of the first query, a restriction of the result of the first query using the second query, a union of the result of the first query and a result of the second query, or an intersection of the result of the first query and the result of the second query; and
a provision logic to provide the virtual query result graph.

11. The system of claim 10, comprising an update logic to monitor changes to the directed graph and to instruct the virtual query logic to re-execute an active virtual query.

12. The system of claim 10, comprising a sequential flow logic to control execution of a sequence of conditional virtual topological queries by the virtual query logic, where a conditional virtual topological query is executed when a result of a virtual topological query meets a condition defined by the conditional virtual topological query.

13. The system of claim 10, further comprising a series of queries that are to update over time as the directed graph in the CMDB changes, different subsequent queries to be invoked depending on the results of some of the queries, and data from the series of queries to be pooled into an active conditional query result graph that is to be provided when a result of any of the queries has changed.

14. A computing device, comprising:
a processor that is adapted to execute stored instructions; and
a storage device that stores instructions, the storage device comprising processor executable code that, when executed by the processor, is configured to:
execute a first topological query identified in a virtual topological query on a stored graph to generate a first result graph; and
generate a virtual query result graph as a function of a second topological query, wherein generating the virtual query result graph comprises, in lieu of executing the second topological query on the stored graph, manipulating the first result graph to generate the virtual query result graph,
wherein manipulating the first result graph comprises at least one executing the second topological query on the first result graph, restricting the first result graph using the second topological query, creating a union of the first result graph and a result of the second topological query, or intersecting the first result graph and the result of the second topological query.

15. The computing device of claim 14, where the processor executable code is configured to monitor changes to the stored graph and control re-execution of the first topological query upon detection of a change to the stored graph.

16. The computing device of claim 14, where the processor executable code is configured to select a technique for manipulation of the first topological query.

* * * * *